US012792927B2

(12) United States Patent
Friedrich et al.

(10) Patent No.: US 12,792,927 B2
(45) Date of Patent: Nov. 10, 2026

(54) DEVICE AND METHOD FOR DETERMINING A KNOWLEDGE GRAPH

(71) Applicant: Robert Bosch GmbH, Stuttgart (DE)

(72) Inventors: Annemarie Friedrich, Weil der Stadt (DE); Subhash Chandra Pujari, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1306 days.

(21) Appl. No.: 17/400,631

(22) Filed: Aug. 12, 2021

(65) Prior Publication Data

US 2022/0092440 A1 Mar. 24, 2022

(30) Foreign Application Priority Data

Sep. 21, 2020 (EP) .................................... 20197168

(51) Int. Cl.

| | |
|---|---|
| ***G06N 5/02*** | (2023.01) |
| ***G06F 18/20*** | (2023.01) |
| ***G06F 18/214*** | (2023.01) |
| ***G06F 18/243*** | (2023.01) |
| ***G06N 3/04*** | (2023.01) |

(52) U.S. Cl.

CPC ........... *G06N 5/02* (2013.01); *G06F 18/2148* (2023.01); *G06F 18/24323* (2023.01); *G06F 18/29* (2023.01); *G06N 3/04* (2013.01)

(58) Field of Classification Search

CPC .......... G06N 5/02; G06N 5/022; G06N 3/045; G06N 3/04; G06F 18/29; G06F 18/24323; G06F 18/2148

See application file for complete search history.

(56) References Cited

U.S. PATENT DOCUMENTS

| | | | | |
|---|---|---|---|---|
| 2012/0082371 | A1 | 4/2012 | Bengio et al. | |
| 2014/0037198 | A1 | 2/2014 | Larlus-Larrondo et al. | |
| 2019/0318202 | A1* | 10/2019 | Zhao | G06F 18/214 |
| 2020/0193265 | A1* | 6/2020 | Hill | G06N 3/045 |
| 2020/0311613 | A1* | 10/2020 | Ma | G06N 20/10 |
| 2020/0342312 | A1* | 10/2020 | Inagaki | G06N 3/04 |

(Continued)

FOREIGN PATENT DOCUMENTS

| | | | |
|---|---|---|---|
| CN | 110442725 | A | 11/2019 |
| CN | 111221983 | A | 6/2020 |

(Continued)

OTHER PUBLICATIONS

Roy, Tree-CNN: A Deep Convolutional Neural Network for Life-long Learning) describes a tree of neural networks (Year: 2018).*

*Primary Examiner* — Tewodros E Mengistu

(74) *Attorney, Agent, or Firm* — NORTON ROSE FULBRIGHT US LLP

(57) ABSTRACT

A device and a computer-implemented method of determining a knowledge graph. The method includes determining an embedding for a sequence of tokens of an instance, determining a first classification for the contextual embedding at a first classifier, determining if the first classification meets a first condition, adding to the knowledge graph a first link between a first node of the knowledge graph representing the instance and a node of the knowledge graph representing the first classification when the first classification meets the first condition and not adding the first link otherwise.

15 Claims, 5 Drawing Sheets

(56) References Cited

U.S. PATENT DOCUMENTS

| | | | | |
|---|---|---|---|---|
| 2021/0224611 | A1* | 7/2021 | Yu | G06V 40/172 |
| 2021/0303783 | A1* | 9/2021 | Misra | G06N 3/0455 |
| 2021/0382944 | A1* | 12/2021 | Li | G06F 16/35 |
| 2021/0397890 | A1* | 12/2021 | Kim | G06V 10/764 |

FOREIGN PATENT DOCUMENTS

| | | | |
|---|---|---|---|
| JP | H0267634 | A | 3/1990 |
| JP | 2018147238 | A | 2/2020 |
| WO | 2019133676 | A1 | 7/2019 |
| WO | 2019234175 | A1 | 12/2019 |

* cited by examiner

DEVICE AND METHOD FOR DETERMINING A KNOWLEDGE GRAPH

CROSS REFERENCE

The present application claims the benefit under 35 U.S.C. § 119 of European Patent Application No. EP 20197168.6 filed on Sep. 21, 2020, which is expressly incorporated herein by reference in its entirety.

FIELD

The present invention relates to a device and a method for determining a knowledge graph, in particular according to a solution of a classification problem.

SUMMARY

In accordance with an example embodiment of the present invention, a computer-implemented method of determining a knowledge graph comprises determining an embedding for a sequence of tokens of an instance, determining a first classification for the embedding at a first classifier, determining if the first classification meets a first condition, adding to the knowledge graph a first link between a first node of the knowledge graph representing the instance and a node of the knowledge graph representing the first classification when the first classification meets the first condition and not adding the first link otherwise. The first classifier is associated with a node of the knowledge graph representing a label in a tree of labels. The first classification may be either that the instance belongs to this label or that the instance does not belong to this label.

Preferably, in accordance with an example embodiment of the present invention, the method comprises determining a second classification at a second classifier, determining if the second classification meets a second condition, adding to the knowledge graph a second link between the node of the knowledge graph representing the instance and a second node of the knowledge graph representing the second classification when the second classification meets the second condition and not adding the second link otherwise. In a multi-task setting a main task is broken into a set of tasks and classifiers output the prediction for each task separately.

The method may comprise providing the embedding to the first classifier, providing the embedding and/or a hidden state of the first classifier resulting from the provided embedding as input to the second classifier. The classifiers of different levels in a hierarchy are assigned to different levels in a hierarchy of labels in the tree of labs. Links between parent and child nodes in the knowledge graph are represented by the hierarchy for the classifiers. The classification or the hidden state of the classifier representing a parent may serve as input for the classifier representing its child.

The method may comprise determining the first link from the node representing the instance to the first node representing the first classification when the second classification meets the condition. When the second classifier is at a lower hierarchical level of the hierarchy for the classifiers than first classifier, the predictions of this ensemble of classifiers is used in a hierarchical prediction mode or by post-processing predictions in order to make hierarchical predictions consistent, e.g., add relevant parent nodes to the knowledge graph if they have not been predicted but children have been predicted, or removing child labels if the parent node has not been predicted.

The sequence of tokens of the instance may be determined. A tokenizer may be used to determine the sequence. The instance may comprise digital text data.

Preferably the first classification and/or the second classification is a binary classification.

The method may comprise providing the knowledge graph with nodes representing a tree of labels, and adding to the knowledge graph a plurality of links to nodes representing labels for the instance. A single label or multiple labels may be assigned to the instance this way.

Preferably the method comprises deciding with the first classification and/or the second classification whether the instance belongs to a category represented by a node in the tree of labels or not.

The method preferably comprises assigning the first classification to a different label than the second classification. Thus, different tasks are solved in the multi-task setting.

In accordance with an example embodiment of the present invention, for training, the method comprises providing a data point that comprises a label for the first classification and/or a label for the second classification, and training the first classifier and/or the second classifier depending on the data point. This means different classifiers are trained to take different decisions. This allows solving different tasks in the multi-task setting. This combines the advantages of hierarchical classification algorithms, where training data is leveraged in an optimal way by training classifiers focusing on different decisions, and the advantages of transformer-based pre-trained neural language models for classification. As one transformer model is shared for all classifiers and as the different classifiers are trained in a multi-task setting, computational feasibility is ensured even in settings where limited computational capacity is available.

Preferably, the method comprises providing a model, in particular a neural network, and training the model to determine the first classification or the second classification. Thus, for each label, a part of the neural network representing one classifier is trained.

Training the model may comprise determining a loss from the output of the first classifier and a loss from the output of the second classifier, and backpropagating the losses to either train the weights in the first classifier and in the second classifier depending on both losses or to train the first classifier depending on the first loss and independent of the second loss and to train the second classifier depending on the second loss and independent of the first loss.

Preferably, the method comprises determining a classification for an input to the so trained model with a classifier at a position in a hierarchy of classifiers in the model, and assigning the classification to a label that corresponds to the position in a hierarchy of a tree of labels. The classifier ensemble in the model may be used for making hierarchical predictions. This makes the labels in the tree consistent.

A device for determining a knowledge graph is configured to perform the steps of the method.

Further advantageous embodiments may be easily derived from the following description and the figures herein.

BRIEF DESCRIPTION OF THE DRAWINGS

FIG. 3-B depicts a schematic view of the classification according to a second aspect, in accordance with an example embodiment of the present invention.

DETAILED DESCRIPTION OF EXAMPLE EMBODIMENTS

Figure 1:
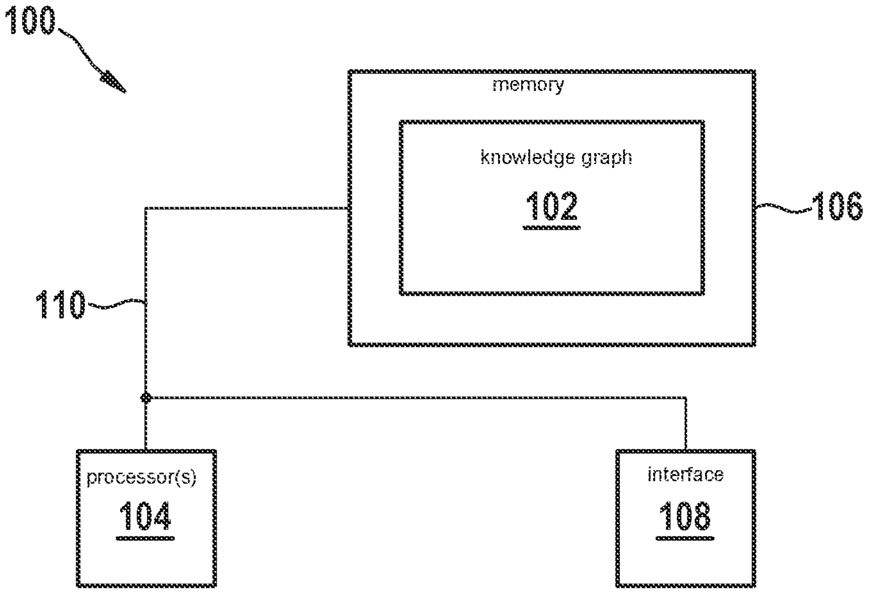
FIG. 1 depicts a device for determining a knowledge graph, in accordance with an example embodiment of the present invention.

A device 100 for determining a knowledge graph 102 includes, in one example embodiment, at least one processor 104, at least one memory 106 and an interface 108. The interface 108 may be adapted to receive input data for the knowledge graph 102 and to output information about the input data. A data link 110 at least temporarily connects the at least one processor 104, the interface 108 and the at least one memory 106.

The device 100 is configured to perform the steps of the method described below.

The at least one memory 106 may comprise a computer program. The computer program may comprise computer-readable instructions that when executed by the at least one processor 104 cause the device 100 to perform steps in this method.

In the example below, the knowledge graph 102 represents a solution of a classification problem that is determined by a hierarchical multi-label classification. Hierarchical multi-label classification is a category of classification problem where an item, e.g., an instance of text or a digital image, is classified into hierarchical labels with the possibility of assigning multiple labels of each hierarchical level.

The instance in the example is stored in the at least one memory 106 or received via the interface 108. The instance may comprises digital text data.

Figure 2:
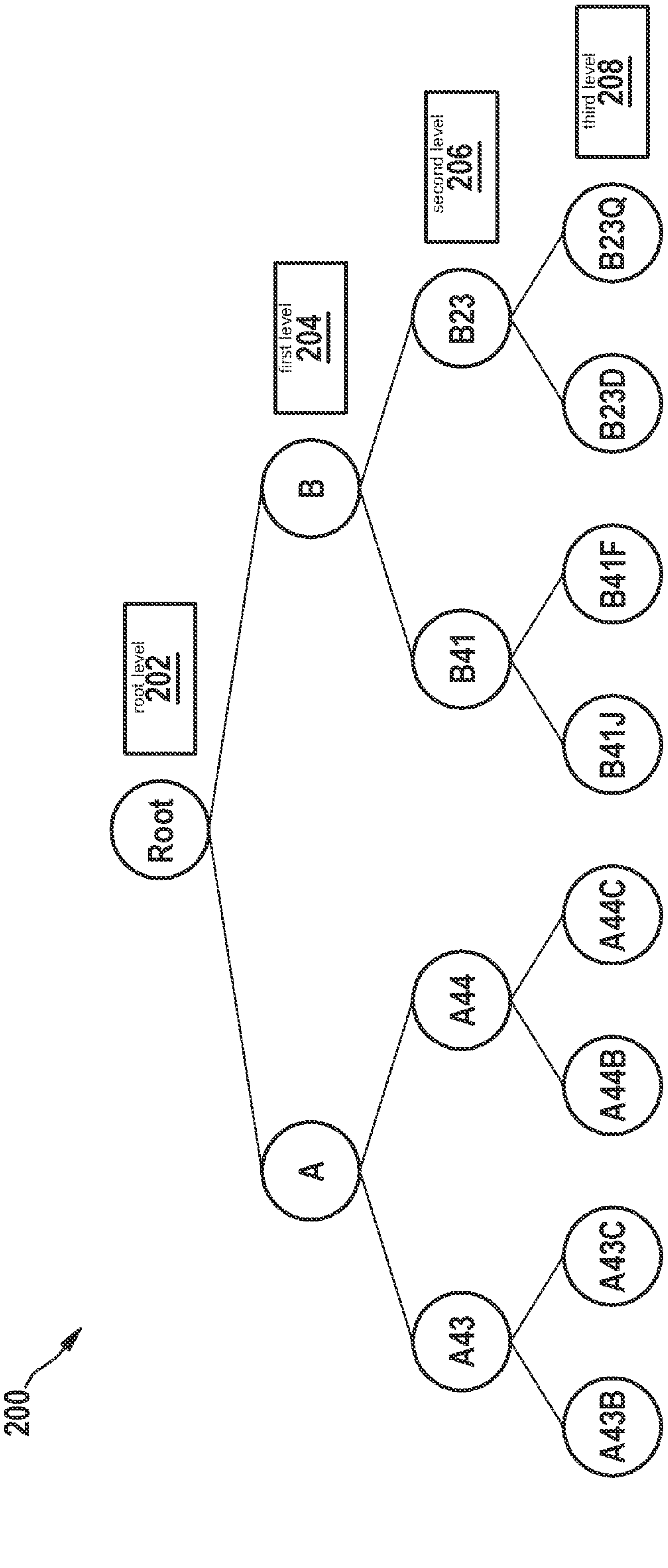
FIG. 2 depicts a tree of labels, in accordance with an example embodiment of the present invention.

In the aspect described below, a binary classifier is trained for a leaf or a non-leaf node of a tree of labels. FIG. 2 depicts an exemplary tree of labels 200 constituting a hierarchy. The hierarchy has a highest level, referred to as root level 202 and in descending hierarchical order a first level 204, a second level 206 and a third level 208.

The root level in the example comprises one node labelled Root. The first level 204 in the example comprises a non-leaf node for a label A and a non-leaf node for a label B. Both are directly linked to the node labelled Root. Both are not linked directly to one another. In one aspect, in the tree of labels each node has exactly one parent.

The second level 206 in the example comprises a non-leaf node for a label A43 and a non-leaf node for a label A44. Both are directly linked to the node A. Both are neither linked to node B nor to the node labelled Root nor linked directly to one another.

The second level 206 in the example comprises a non-leaf node for a label B41 and a non-leaf node for a label B23. Both are directly linked to the node B. Both are neither linked to node B nor to the node labelled Root nor linked directly to one another.

The third level 208 in the example comprises a leaf node for a label A43B and a leaf node for a label A43C. Both are directly linked to the node A43. Both are not linked to any other node.

The third level 208 in the example comprises a leaf node for a label A44B and a leaf node for a label A44C. Both are directly linked to the node A44. Both are not linked to any other node.

The third level 208 in the example comprises a leaf node for a label B41J and a leaf node for a label B41F. Both are directly linked to the node B41. Both are not linked to any other node.

The third level 208 in the example comprises a leaf node for a label B23D and a leaf node for a label B23Q. Both are directly linked to the node B23. Both are not linked to any other node.

Figure 3A:
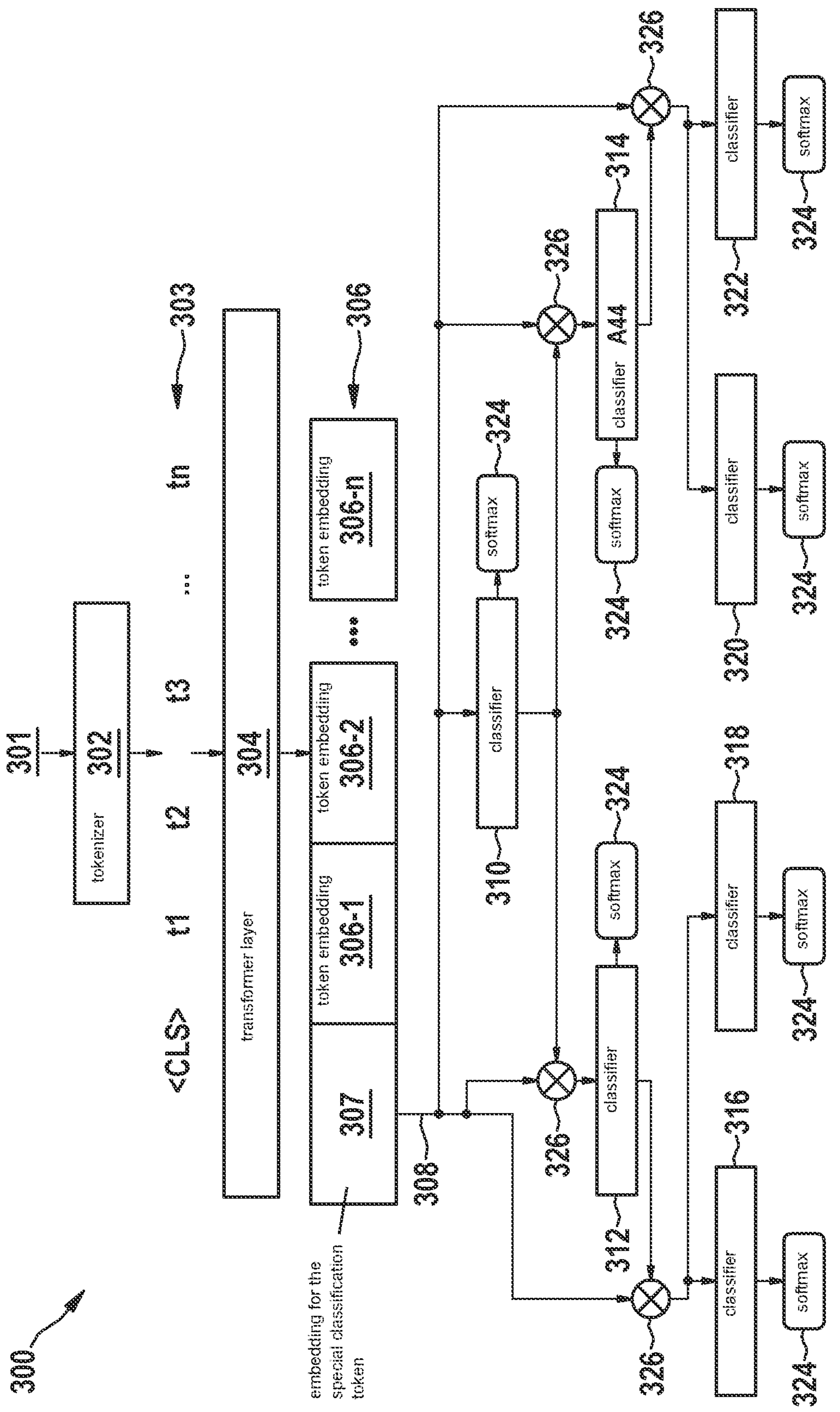
FIG. 3-A depicts a schematic view of a classification according to a first aspect, in accordance with an example embodiment of the present invention.
Figure 3B:
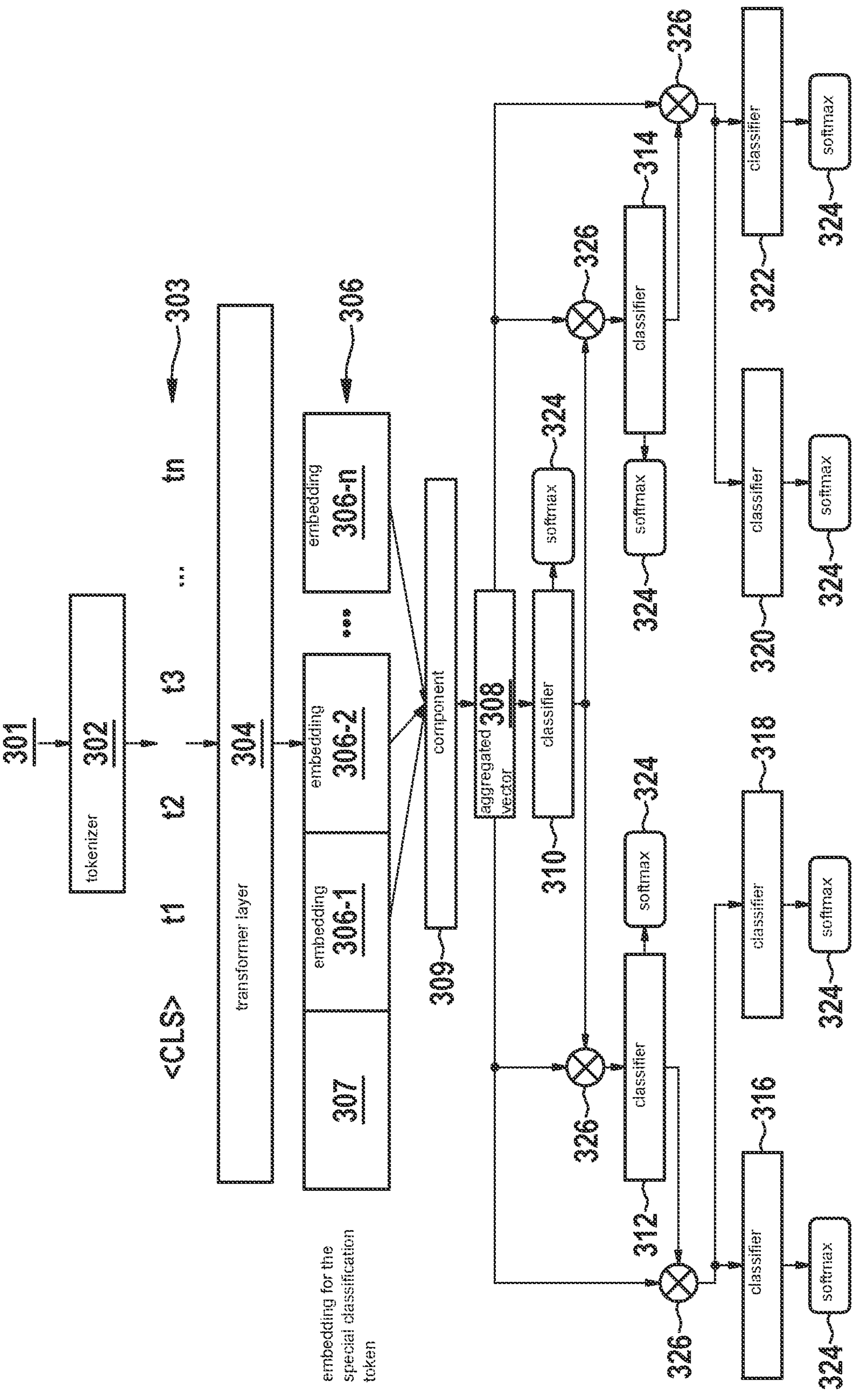

A part of an ensemble 300 of classifiers where one classifier is trained per node of the tree is depicted in a schematic view of a classification according to a first aspect in FIG. 3-A. FIG. 3-B depicts the classification according to a second aspect.

More specifically, FIG. 3-A and FIG. 3-B depict artificial neural network architectures with classifiers for labels in the branch of the tree of FIG. 2 including the node A. The ensemble 300 according to the first aspect is described below with reference to FIG. 3-A.

An input to the ensemble 300 may be an instance comprising a sequence of tokens. The input may comprise a title or an abstract of a patent document. In this example, the labels are according to a patent classification.

In the first aspect depicted in FIG. 3-A the input is a raw text 301 without any kind of preprocessing. An appropriate tokenizer 302, e.g. wordpiece tokenization, tokenizes the text 301 into a sequence of tokens. This sequence of tokens is in the example one-hot encoded to form an input vector t1, t2, t3, . . . tn per token using token identifications 303 of a corresponding vocabulary as a preparation for a transformer layer 304 referred to as transformer below. An input vector for a special classification token is provided as well and labelled <CLS> in FIG. 3-A.

The transformer 304 in the example is a transformer-based neural language model, e.g. a pre-trained neural language model, e.g., BERT or RoBERTa.

In the transformer 304, the input vectors <CLS>, t1, t2, t3, . . . tn representing the special classification token and the one-hot encoded sequence of tokens are passed through a pre-trained transformer, i.e. a language model, to generate an embedding 306. The embedding 306 comprises token embeddings 306-1, 306-2, . . . , **306-*n* for the input vectors t1, t2, t3, . . . tn. The embedding 306 includes an embedding 307** for the special classification token, e.g., CLS for BERT.

In one aspect, BERT outputs a special sequence of embeddings, the first one of which is the embedding 307 that corresponds to the classification token and can be used as a representation of the entire input sequence. In addition, BERT also outputs one embedding for each token. In this aspect, the CLS-embedding is used to form a single embedding that serves as input for the classifiers and/or the rest of the neural network.

The example is explained below based on using the embedding of the CLS token as the aggregated vector 308.

The transformer's output embeddings 306 form a matrix. A dimension of the matrix depends on the maximum number of tokens. With number of wordpiece tokens as M in a text and an embedding size of E, the transformer 304 generates a token tensor of dimension M×E. The first vector within this token tensor corresponds to the embedding 307 of the CLS token and can be regarded as representing an embedding for the entire input sequence, i.e., it can be used as the aggregated embedding 308.

The aggregated embedding 308 may be passed to a task specific hidden layer of a classifier directly.

In FIG. 3-A, a plurality of classifiers is depicted that is arranged according to a hierarchy that matches the hierarchy of the leafs and non-leaf nodes in the tree of labels depicted in FIG. 2.

More specifically, FIG. 3-A depicts a classifier 310 corresponding to a first level of the hierarchy that is trained for determining for the aggregated embedding 308 a value of a classification assigned to label A. A classifier 312 corresponding to a second level of the hierarchy is trained for determining for its input a value of a classification in particular a value of a binary classification assigned to label A43. A classifier 314 corresponding to the second level of the hierarchy is trained for determining for its input a value of a classification in particular a value of a binary classification assigned to label A44. A classifier 316 corresponding to a third level of the hierarchy is trained for determining for its input a value of a classification in particular a value of a binary classification assigned to label A43B. A classifier 318 corresponding to the third level of the hierarchy is trained for determining for its input a value of a classification in particular a value of a binary classification assigned to label A43C. A classifier 320 corresponding to the third level of the hierarchy is trained for determining for its input a value of a classification in particular a value of a binary classification assigned to label A44B. A classifier 322 corresponding to the third level of the hierarchy is trained for determining for its input a value of a classification in particular a value of a binary classification assigned to label A44C.

In a training, shared layers for two tasks may be used. Shared layers in this aspect refers to layers of the artificial neural network for classifiers that were used to compute the respective outputs. For the classifiers for the labels A43C and A43B the shared layers include layers of the classifier for label A, 308, the classifier for label A43, 312, the classifier for label A43B, 316, the classifier for label A43C, 318 and the BERT layers but neither the classifier for label A44, 314, nor the classifier for label A44B, 320, nor the classifier for label A44C, 322.

The binary classification in the example is true if the instance is assigned to the label and false otherwise. True is referred to as indication that the instance belongs to this label. False is referred to as indication that the instance does not belong to this label.

A softmax layer or softmax operation 324 may be provided for the values of the classifications. As shown in the part of ensemble 300 depicted FIG. 3-A, with 7 labels across the hierarchy, 7 softmax layer or softmax operation 324 may be used.

The classifiers are arranged in the example as label specific layers. Identifying whether an input can be assigned to a label or not is in the example a task. The classifiers could in general be any type of classifier.

The input to a task makes use of the hierarchical relations between labels and passes the learning of a higher level task to a lower level task. The input for the classifier 310 in the example is the aggregated embedding 308.

The input for any classifier may comprise an output of a classifier that is in a higher level of the hierarchy. The input for such classifiers may comprise a concatenation of the aggregated embedding 308 with an output of a classifier that is in a higher level of hierarchy. In the example, an optional means 326 for combining, e.g., concatenating, the aggregated embedding 308 with a respective output is depicted. According to one aspect, for the second level and below, the aggregated embedding 308 or the CNN output may be combined, e.g. concatenated, with the hidden state of a parent which is passed as an input to a dense layer of a child.

A task is performed in the example by at least one dense layer of the classifier. A set of dense layers with a softmax function after the last dense layer may be used to determine the output.

The input for any classifier may be a vector. The vector may be passed through k-dense layers each with a size D.

The classifiers are task specific. A task specific classifier in the example makes a binary classification to predict whether the given instance, e.g. the text or a word sequence from the text or the digital image, belongs to a particular class or not. The task specific classifier in the example comprises a dense layer with a softmax output 324 of dimension 2. The dense layer may be provided with a rectifier linear unit, ReLU, as an activation function and binary cross-entropy as a loss.

The ensemble 300 according to the second aspect is described below with reference to FIG. 3-B. Elements that have the same function as described above for FIG. 3-A are labelled with the same reference sign in FIG. 3-B.

The ensemble 300 according to the second aspect differs from the ensemble 300 according to the first aspect only in that the information of the sequence of tokens t1, t2, t3, . . . tn is aggregated into one aggregated embedding 308, e.g., a single vector. In contrast to the first aspect, the aggregated embedding 308 is not based on the embedding 307 of the special classification token e.g., CLS in BERT. The aggregation is instead determined from the token embeddings 306-1, 306-2, . . . , **306-*n* by a component 309** which may be a convolutional neural network layer, CNN layer, or an aggregation function such as average, with or without attention.

A set of convolutional layers with varying kernel size may be applied on the tensor containing the embeddings of all input tokens. The convolutional layers in the example comprise kernels with size 2,3,4,5 and F filters per convolution layer. A CNN layer is used in the example as component 309 to create a single vector representing its entire input sequence.

Figure 4:
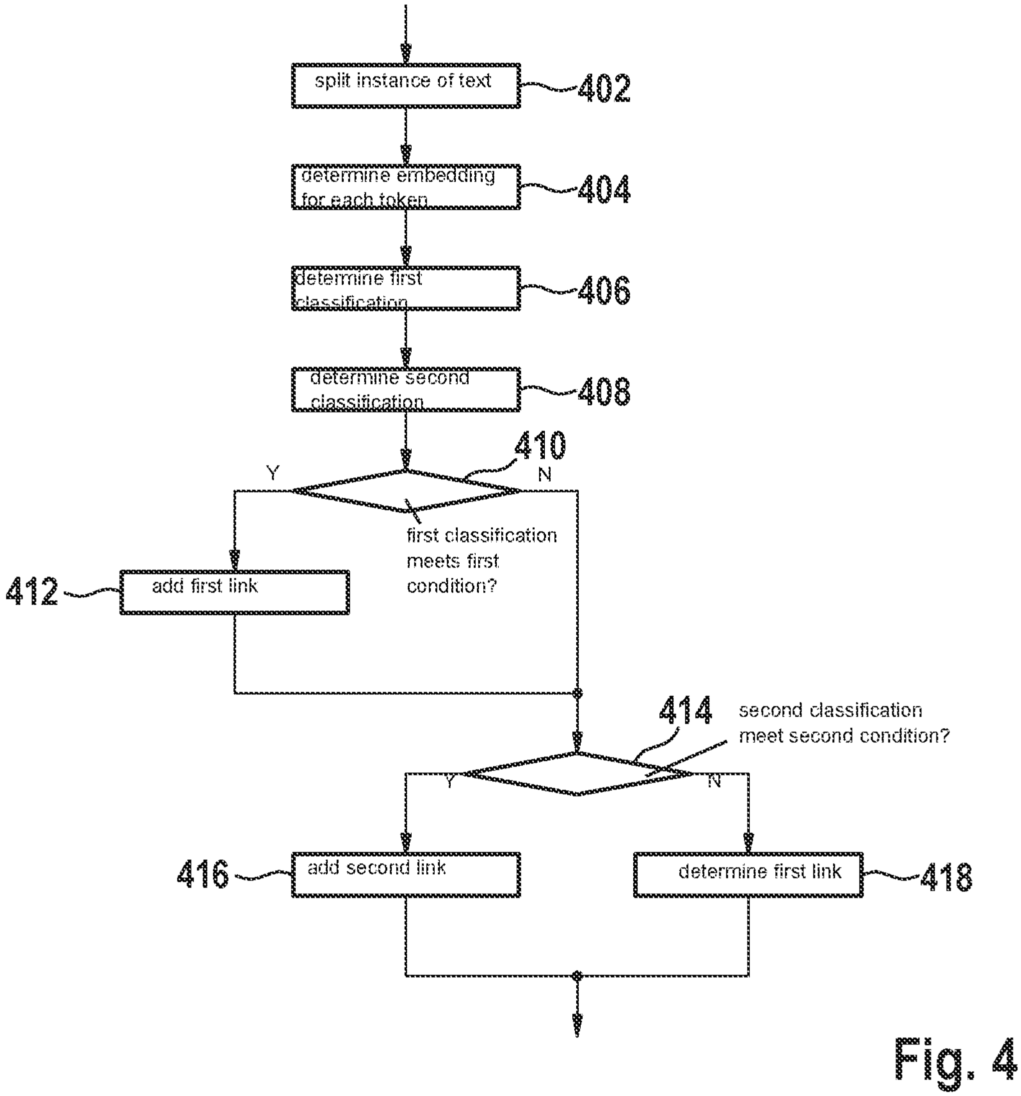
FIG. 4 depicts steps in a method of determining the knowledge graph, in accordance with an example embodiment of the present invention.

A computer implemented method of determining the knowledge graph 102 is described below with reference to FIG. 4. The following description assumes one classifier per leaf or non-leaf node of the tree of labels.

The method uses a trained model. In the example, the model represents the ensemble 300. This means the model represents a neural network with several classifiers performing hierarchical classification. The model in the example is a neural network comprising layers and levels as described above. A linear layer in the example produces two logits for a binary classification.

The method will be described by way of example with an exemplary hierarchy for the classifiers and for a trained first classifier and a trained second classifier.

The first classifier is trained to determine a first classification. The first classifier is associated with a first node of the knowledge graph 102 representing a first label. The second classifier is trained to determine a second classification. The second classifier is associated with a second node of the knowledge graph 102 representing a second label.

The hierarchy for the classifiers may comprise further different classifiers that are trained to take different decisions. The classifiers of different levels in the hierarchy for the classifiers are assigned to different levels in a hierarchy of labels in the tree of labels. These may be used in the same manner as described for the first classifier and the second classifier.

Links between parent and child nodes in the knowledge graph 102 are represented by the hierarchy for the classifiers. The classification or hidden state of a classifier representing a parent may serve as input for a classifier representing its child.

The first classification and the second classification in the example is a binary classification for one particular label of the tree of labels.

According to the method, the output of the transformer 304 may be shared for all classifiers. The different classifiers are trained in a multi-task setting described below in further detail. This means that the parameters of the transformer 304 may be actually trained as well.

The method comprises a step 402 of splitting an instance of text into a sequence of tokens with the tokenizer 302.

Afterwards a step 404 is executed.

In the step 404, for each token, an embedding is determined with the transformer 304, e.g. the transformer-based neural language model. At the same time, step 404 determines a single embedding. The single embedding may be the aggregated embedding 308, e.g. for the CLS token or the output of the component 309, which can be used to represent the entire sequence.

Afterwards a step 406 is executed.

In the step 406 a first classification is determined for the embedding at the first classifier. To this end, the embedding is provided in the example to the first classifier.

Afterwards a step 408 is executed.

In the step 408, a second classification is determined at the second classifier. To this end, the embedding and/or a hidden state of the first classifier resulting from the embedding provided in step 406 may be provided as input to the second classifier.

Optionally, the embedding may be concatenated with the classification or the hidden state.

Afterwards a step 410 is executed.

In the step 410, it is determined if the first classification meets a first condition. The first classification may be either that the instance belongs to this label or that the instance does not belong to this label.

If the first classification meets the first condition, e.g., indicates that the instance belongs to this label, a step 412 is executed. Otherwise a step 414 is executed.

In the step 412 a first link between a first node of the knowledge graph 102 representing the instance and a node of the knowledge graph 102 representing the first classification is added to the knowledge graph 102.

Afterwards the step 414 is executed.

In step 414 it is determined, if the second classification meets a second condition. The second classification may be either that the instance belongs to this label or that the instance does not belong to this label.

If the second classification meets the second condition, e.g., indicates that the instance belongs to this label, a step 416 is executed. Otherwise a step 418 is executed.

In step 416 a second link between the node of the knowledge graph 102 representing the instance and a second node of the knowledge graph 102 representing the second classification is added to the knowledge graph 102.

Afterwards the step 418 is executed. Step 418 is optional.

In the step 418 the first link is determined from the node representing the instance to the first node representing the first classification when the second classification meets the condition. When the second classifier is at a lower hierarchical level of the hierarchy for the classifiers than first classifier, the predictions of this ensemble of classifiers is used in a hierarchical prediction mode or by post-processing predictions in order to make hierarchical predictions consistent, e.g., add relevant parent nodes to the knowledge graph if they have not been predicted but children have been predicted, or removing child labels if the parent node has not been predicted.

In a multi-task setting a main task is broken into a set of tasks that correspond to different classifiers. The classifiers output the prediction for each task separately. The neural network may have more levels of the hierarchy than depicted in FIG. 4. Thus a more complex knowledge graph 102 is easily determined.

For an unseen digital image or text sequence instance, a set of labels is predicted this way using the multi-head neural network provided by the model.

The set of labels may optionally be made consistent with the predicted hierarchical label set. To this end, parent labels may be added or child labels removed according to the predicted label set.

A node n may be added to the knowledge graph 102 representing the original digital image or text sequence. Links labeled as belongsToCategory may be added between n and any node L representing one of the predicted labels. These may or may not include parent categories.

Figure 5:
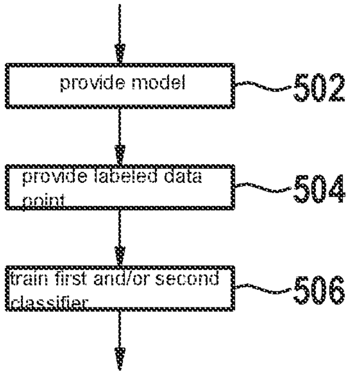
FIG. 5 depicts steps in the method for training a model for determining the knowledge graph, in accordance with an example embodiment of the present invention.

Steps for training the model are described with reference to FIG. 5.

In a step 502 the model is provided.

In particular the neural network is provided with structure according to the tree of labels. The neural network may comprise a plurality of convolutional neural network layers, dropout layers, or dense layers.

In a step 504 a labelled data point is provided.

The data point is assigned in the example to the first classification or to the second classification or to both. The data point in the example comprises a label for the first classifier and the second classifier.

The training is performed with a plurality of labelled data points that are assigned to different classifications or to a plurality of classifications.

Afterwards a step 506 is executed.

In step 506, the first classifier and/or the second classifier are trained depending on the data point.

The model is trained to determine the first classification and/or the second classification. Thus, for each label, a classifier is trained, e.g., one convolutional network, at least one dense layer or a part of the artificial neural network.

There may be more than two levels in the hierarchy and classifiers.

This means different classifiers are trained to take different decisions. This combines the advantages of hierarchical classification algorithms, where training data is leveraged in an optimal way by training classifiers focusing on different decisions, and the advantages of transformer-based pre-trained neural language models which generally result in state-of-the-art performance for text classification approaches. The use of hierarchical learning algorithms in a multi-task setting makes this combination possible, as it would not be possible to keep many transformer models in memory at the same time. As one transformer model is shared for all classifiers and as the different classifiers are trained in a multi-task setting, computational feasibility is ensured even in settings with limited computing capacity is available.

In one aspect, training the model comprises determining a first loss from the output of the first classifier and a second loss from the output of the second classifier, backpropagating the losses to train the weights in the first classifier and in the second classifier. In one example the first classifier and the second classifier do not belong to shared layers. In this case, the first loss is determined independent of the output of the second classifier and the parameters of the first classifier are updated depending on the first loss and independent of the second loss. The second loss is determined independent of the output of the first classifier and the parameters of the second classifier are updated depending on the second loss and independent of the first loss. In another example, the first classifier and the second classifier belong to shared layers. In this example, the shared layers are updated depending on the first loss and the second loss. The parameters of the first classifier and the second classifier are for example updated depending on a sum of the first loss and the second loss. The first loss or the second loss may be determined as sum of a norm of a difference of the softmax outputs 324 for an input defined in the data point to a reference defined in the data point for this input. This input may be the aggregated embedding 308, e.g. the embedding of the CLS token or the embedding aggregating the information in the series of tokens t1, . . . , tn of a training instance or the training instance.

In another aspect, training the model comprises when the data point is labelled for the first classification and not for the second classification determining a loss from the output of the first classifier and backpropagating the loss to train weights in the first classifier and not in the second classifier.

In another aspect, training the model comprises when the data point is labelled for the second classification and not for the first classification determining a loss from the output of the second classifier and backpropagating the loss to train weights in the second classifier and not in the first classifier.

The training may comprise a plurality of epochs.

The steps for training may be performed before using the model as described above. In that case, after the training, the step 402 is executed.

The method may comprise a step of determining a classification for an input to the so trained model. The classification may be made with a classifier at a position in a hierarchy of classifiers in the model. The method may further comprise assigning the classification to a label that corresponds to the position in a hierarchy of a tree of labels.

What is claimed is:

1. A computer-implemented method for determining a knowledge graph based on a hierarchical label tree comprising labels organized in parent-child relationships, comprising the following steps:

determining an embedding for a sequence of tokens of an instance using a single transformer model;

determining a first classification for the embedding at a first classifier associated with a first label in the hierarchical label tree, the first classifier belonging to an ensemble that includes the first classifier in a plurality of classifiers arranged according to a hierarchy corresponding to the hierarchical label tree;

determining if the first classification meets a first condition;

adding to the knowledge graph a first link between a first node of the knowledge graph representing the instance and a node of the knowledge graph representing the first classification when the first classification meets the first condition and not adding the first link when the first classification does not meet the first condition, wherein:

the ensemble shares across the plurality of classifiers in the hierarchy the single transformer model that generates an output corresponding to the embedding, and the output is shared for all the plurality of classifiers in the hierarchy of the ensemble, wherein different classifiers in the plurality of classifiers that are arranged in different levels in the hierarchy are trained in a multi-task setting to take different decisions regarding whether instances belong to the labels according to the level in which the classifiers are arranged;

determining a second classification at a second classifier;

determining if the second classification meets a second condition;

adding to the knowledge graph a second link between the first node of the knowledge graph representing the instance and a second node of the knowledge graph representing the second classification when the second classification meets the second condition and not adding the second link when the second classification does not meet the second condition;

providing the embedding to the first classifier; and providing the embedding and/or a hidden state of the first classifier resulting from the provided embedding as input to the second classifier.

2. The method according to claim 1, further comprising:

determining the first link from the first node representing the instance to the node representing the first classification when the second classification meets the second condition.

3. The method according to claim 1, further comprising:

determining the sequence of tokens of the instance.

4. The method according to claim 1, wherein the instance includes digital text data.

5. The method according to claim 1, wherein the first classification and/or the second classification is a binary classification.

6. The method according to claim 1, further comprising:

providing the knowledge graph with nodes representing a tree of labels, and adding to the knowledge graph a plurality of links to nodes representing labels for the instance.

7. The method according to claim 6, further comprising:

deciding based on the first classification and/or the second classification whether the instance belongs to a category represented by a node in the tree of labels or not.

8. The method according to claim 6, further comprising:

assigning the first classification to a different label than the second classification.

9. The method according to claim 1, further comprising:

providing a data point that includes a label for the first classification and/or a label for the second classification; and training the first classifier and/or the second classifier depending on the data point.

10. The method according to claim 1, further comprising:

providing a model; and training the model to determine the first classification or the second classification.

11. The method according to claim 10, wherein the model is a neural network.

12. The method according to claim 10, wherein the training of the model includes:

determining a first loss from an output of the first classifier and a second loss from an output of the second classifier; and backpropagating the first and second losses either to train weights in the first classifier and in the second classifier depending on both the first and second losses or to train the first classifier depending on the first loss and independent of the second loss and to train the second classifier depending on the second loss and independent of the first loss.

13. The method according to claim 10, further comprising:

determining a classification for an input to the trained model with a classifier at a position in the hierarchy in the model; and assigning the classification to a label that corresponds to the position in a hierarchy of a tree of labels.

14. A device configured to determine a knowledge graph based on a hierarchical label tree comprising labels organized in parent-child relationships, the device a hardware processor configured to:

determine an embedding for a sequence of tokens of an instance using a single transformer model;

determine a first classification for the embedding at a first classifier associated with a first label in the hierarchical label tree, the first classifier belonging to an ensemble that includes the first classifier in a plurality of classifiers arranged according to a hierarchy corresponding to the hierarchical label tree;

determine if the first classification meets a first condition;

add to the knowledge graph a first link between a first node of the knowledge graph representing the instance and a node of the knowledge graph representing the first classification when the first classification meets the first condition and not adding the first link when the first classification does not meet the first condition, wherein:

the ensemble shares across the plurality of classifiers in the hierarchy the single transformer model that generates an output corresponding to the embedding, and the output is shared for all the plurality of classifiers in the hierarchy of the ensemble, wherein different classifiers in the plurality of classifiers that are arranged in different levels in the hierarchy are trained in a multi-task setting to take different decisions regarding whether instances belong to the labels according to the level in which the classifiers are arranged;

determine a second classification at a second classifier;

determine if the second classification meets a second condition;

add to the knowledge graph a second link between the first node of the knowledge graph representing the instance and a second node of the knowledge graph representing the second classification when the second classification meets the second condition and not adding the second link when the second classification does not meet the second condition;

provide the embedding to the first classifier; and provide the embedding and/or a hidden state of the first classifier resulting from the provided embedding as input to the second classifier.

15. A non-transitory computer-readable storage medium on which is stored a computer program including computer readable instructions for determining a knowledge graph based on a hierarchical label tree comprising labels organized in parent-child relationships, the instructions, when executed by a computer, causing the computer to perform the following steps:

determining an embedding for a sequence of tokens of an instance using a single transformer model;

determining a first classification for the embedding at a first classifier associated with a first label in the hierarchical label tree, the first classifier belonging to an ensemble that includes the first classifier in a plurality of classifiers arranged according to a hierarchy corresponding to the hierarchical label tree;

determining if the first classification meets a first condition;

adding to the knowledge graph a first link between a first node of the knowledge graph representing the instance and a node of the knowledge graph representing the first classification when the first classification meets the first condition and not adding the first link when the first classification does not meet the first condition, wherein:

the ensemble shares across the plurality of classifiers in the hierarchy the single transformer model that generates an output corresponding to the embedding, and the output is shared for all the plurality of classifiers in the hierarchy of the ensemble, wherein different classifiers in the plurality of classifiers that are arranged in different levels in the hierarchy are trained in a multi-task setting to take different decisions regarding whether instances belong to the labels according to the level in which the classifiers are arranged;

determining a second classification at a second classifier;

determining if the second classification meets a second condition;

adding to the knowledge graph a second link between the first node of the knowledge graph representing the instance and a second node of the knowledge graph representing the second classification when the second classification meets the second condition and not adding the second link when the second classification does not meet the second condition;

providing the embedding to the first classifier; and providing the embedding and/or a hidden state of the first classifier resulting from the provided embedding as input to the second classifier.

* * * * *